US012749337B2

(12) United States Patent
Chen et al.

(10) Patent No.: US 12,749,337 B2
(45) Date of Patent: Sep. 29, 2026

(54) FACE TRACKING METHOD AND ELECTRONIC DEVICE

(71) Applicant: BIGO TECHNOLOGY PTE. LTD., Singapore (SG)

(72) Inventors: Wenyu Chen, Singapore (CN); Gengdai Liu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 537 days.

(21) Appl. No.: 18/260,126

(22) PCT Filed: Jan. 4, 2022

(86) PCT No.: PCT/CN2022/070133
§ 371 (c)(1),
(2) Date: Jun. 30, 2023

(87) PCT Pub. No.: WO2022/148349
PCT Pub. Date: Jul. 14, 2022

(65) Prior Publication Data

US 2024/0062579 A1 Feb. 22, 2024

(30) Foreign Application Priority Data

Jan. 5, 2021 (CN) ......................... 202110007729.1

(51) Int. Cl.
*G06V 40/16* (2022.01)
*G06T 7/246* (2017.01)
(Continued)

(52) U.S. Cl.
CPC ............ *G06V 40/172* (2022.01); *G06T 7/248* (2017.01); *G06T 7/60* (2013.01); *G06T 17/20* (2013.01);
(Continued)

(58) Field of Classification Search
None
See application file for complete search history.

(56) References Cited

U.S. PATENT DOCUMENTS

2012/0321134 A1 12/2012 Shen et al.

FOREIGN PATENT DOCUMENTS

CN 103646391 A 3/2014
CN 108345821 A 7/2018
(Continued)

OTHER PUBLICATIONS

Qi, X., Liu, C., & Schuckers, S. (2018). CNN based key frame extraction for face in video recognition. In 2018 IEEE 4th International Conference on Identity, Security, and Behavior Analysis (ISBA) (pp. 1-8).*
(Continued)

*Primary Examiner* — Andrew W Bee
*Assistant Examiner* — Christine Zhao
(74) *Attorney, Agent, or Firm* — Kolitch Romano Dascenzo Gates LLP

(57) ABSTRACT

Provided is a face tracking method. The method includes: in a process of tracking a face in a video frame, determining whether an optimization thread is running; in response to the optimization thread running and the video frame being a key frame, updating a second keyframe data set based on the video frame; in response to receiving a clear instruction from the optimization thread, clearing the video frame in the second keyframe data set, and updating the second keyframe data set to a first keyframe data set; in response to the optimization thread not running and the video frame being the key frame, updating the first keyframe data set based on the video frame and the second keyframe data set; and making the optimization thread optimize a facial identity
(Continued)

based on the first keyframe data set by invoking the optimization thread upon updating the first keyframe data set.

11 Claims, 6 Drawing Sheets

(51) Int. Cl.
*G06T 7/60* (2017.01)
*G06T 17/20* (2006.01)
*G06V 10/77* (2022.01)
*G06V 20/40* (2022.01)

(52) U.S. Cl.
CPC .......... *G06V 10/7715* (2022.01); *G06V 20/41* (2022.01); *G06V 20/46* (2022.01); *G06V 40/165* (2022.01); *G06V 40/171* (2022.01); *G06V 40/174* (2022.01); *G06T 2207/10016* (2013.01); *G06T 2207/30201* (2013.01)

(56) References Cited

FOREIGN PATENT DOCUMENTS

| | | |
|---|---|---|
| CN | 111914613 A | 11/2020 |
| CN | 112712044 A | 4/2021 |

OTHER PUBLICATIONS

Wang, Z., Ling, J., Feng, C., Lu, M., & Xu, F. (2022). Emotion-Preserving Blendshape Update With Real-Time Face Tracking. IEEE Transactions on Visualization and Computer Graphics, 28(6), 2364-2375.*

Cao, C., Hou, Q., & Zhou, K. (2014). Displaced dynamic expression regression for real-time facial tracking and animation. ACM Trans. Graph., 33(4).*

International Search Report of the International Searching Authority for State Intellectual Property Office of the People's Republic of China in PCT application No. PCT/CN2022/070133 issued on Mar. 30, 2022, which is an international application to which this application claims priority.

The State Intellectual Property Office of People's Republic of China, First Office Action in Patent Application No. 202110007729.1 issued on May 31, 2023, which is a foreign counterpart application corresponding to this U.S. Patent Application, to which this application claims priority.

Cao, Chen et al., "3D Shape Regression for Real-time Facial Animation", ACM Transactions on Graphics (TOG), vol. 32, No. 4, Article 41, Publication Date: Jul. 2013.

Cao, Chen et al., "Displaced Dynamic Expression Regression for Real-time Facial Tracking and Animation", ACM Transactions on graphics (TOG), vol. 33, No. 4, Article 43, Publication Date: Jul. 2014.

* cited by examiner

FACE TRACKING METHOD AND ELECTRONIC DEVICE

This application is a U.S. national stage of international application No. PCT/CN2022/070133, filed on Jan. 4, 2022, which claims priority to Chinese Patent Application No. 202110007729.1, filed on Jan. 5, 2021, the disclosures of which are incorporated herein by reference in their entireties.

TECHNICAL FIELD

The present disclosure relates to the field of video processing technologies, and in particular, relates to a face tracking method and an electronic device.

BACKGROUND

Video-based face tracking is used for achieving some vision enhancement effects, such as, trying on hats and glasses in videos and adding moustaches and tattoos, and is also used for driving expression motions of virtual figures.

A two-dimensional face in a video is a two-dimensional projection of a three-dimensional face acquired by combing a facial identity and expressions of a user. In a real-time face tracking process, the facial identity and expressions of the user can be accurately calculated based on two-dimensional keypoints on the face in the video, thus the facial identity is required to be quickly reconstructed to perform face tracking.

SUMMARY

The present disclosure provides a face tracking method and an electronic device.

A face tracking method is provided in the present disclosure. The face tracking method is applicable to a tracking thread, wherein a first keyframe data set and a second keyframe data set are maintained on the tracking thread. The face tracking method includes:

- determining, in a process of tracking a face in a video frame, whether an optimization thread is running;
- in response to the optimization thread running and the video frame being a keyframe, updating the second keyframe data set based on the video frame;
- in response to receiving a clear instruction for clearing a video frame in the second keyframe data set from the optimization thread, clearing the video frame in the second keyframe data set, and updating the second keyframe data set to the first keyframe data set;
- in response to the optimization thread not running and the video frame being the keyframe, updating the first keyframe data set based on the video frame and the second keyframe data set; and
- making the optimization thread optimize a facial identity based on the first keyframe data set by invoking the optimization thread upon updating the first keyframe data set.

A face tracking method is provided in the present disclosure. The face tracking method is applicable to an optimization thread. The method includes:

- determining a current facial identity vector used by a tracking thread as an initial facial identity vector upon invoking the optimization thread;
- acquiring a first keyframe data set, wherein the first keyframe data set is a data set updated by the tracking thread upon performing face tracking, and the first keyframe data set includes face tracking data;
- acquiring optimized face tracking data by optimizing the face tracking data in the first keyframe data set based on the initial facial identity vector;
- acquiring an optimized facial identity vector by performing iterative optimization on the initial facial identity vector based on the optimized face tracking data;
- upon each iteration, determining, based on the optimized facial identity vector and the initial facial identity vector, whether an iteration stop condition is satisfied;
- in response to the iteration stopping stop being satisfied, making the tracking thread determine, in response to receiving the optimized facial identity vector, a received facial identity vector as the current facial identity vector by sending the optimized facial identity vector to the tracking thread;
- in response to the iteration stop condition being not satisfied, making the tracking thread update, in response to a second keyframe set of a second keyframe data set being a non-empty set, the second keyframe data set to the first keyframe data set upon receiving a clear instruction by sending the clear instruction for clearing video frame in the second keyframe data set to the tracking thread; and
- determining the optimized facial identity vector as the initial facial identity vector, and returning to the process of acquiring a first keyframe data set.

A face tracking apparatus is provided in the present disclosure. The face tracking apparatus is applicable to a tracking thread, wherein a first keyframe data set and a second keyframe data set are maintained on the tracking thread. The face tracking apparatus includes: an optimization thread running determining module, a second keyframe data set updating module, a clearing module, a first keyframe data set updating module, and an optimization thread invoking module.

The optimization thread running determining module is configured to determine, in a process of tracking a face in a video frame, whether an optimization thread is running.

The second keyframe data set updating module is configured to, in response to the optimization thread running and the video frame being a keyframe, update the second keyframe data set based on the video frame.

The clearing module is configured to, in response to receiving a clear instruction for clearing a video frame in the second keyframe data set from the optimization thread, clear the video frame in the second keyframe data set, and update the second keyframe data set to the first keyframe data set.

The first keyframe data set updating module is configured to, in response to the optimization thread not running and the video frame being the keyframe, update the first keyframe data set based on the video frame and the second keyframe data set.

The optimization thread invoking module is configured to make the optimization thread optimize a facial identity based on the first keyframe data set by invoking the optimization thread upon updating the first keyframe data set.

An electronic device for tracking a face is provided in the present disclosure. The electronic device includes:

- one or more processors; and
- a storage apparatus, configured to store one or more programs;
- wherein the one or more programs, when run by the one or more processors, cause the one or more processors to perform the face tracking method as defined above.

DETAILED DESCRIPTIONS

The present disclosure is described hereinafter with reference to the accompanying drawings and embodiments. The specific embodiments described herein are merely illustrative of the present disclosure. For convenience of description, only portions relevant to the present disclosure are shown in the accompanying drawings.

In a real-time facial identity reconstruction process, the facial identity is reconstructed by extracting keyframes from a real-time video of the user, which is very convenient for the user. As video data increases, the facial identity is optimized based on more keyframes, such that errors are reduced. However, in the facial identity reconstruction process, a keyframe cannot be added by a tracking thread during running of a facial identity optimization thread. The keyframe is added by the tracking thread after the running of the facial identity optimization thread ends. As a result, the keyframe cannot be added to optimize the facial identity even if the tracking thread detects a keyframe during running of the facial identity optimization thread. The facial identity optimization thread is invoked once every time one keyframe is added. In one aspect, a quantity of the keyframes is increased slowly and a keyframe can be omitted, such that the facial identity optimization converges slowly and the facial identity is inaccurate. In another aspect, the number of invocations of the face optimization thread is increased. Due to the above-mentioned two reasons, instantaneity of the real-time facial identity reconstruction is poor, such that the real-time facial identity reconstruction is not applicable to real-time face tracking.

First Embodiment

Figure 1:
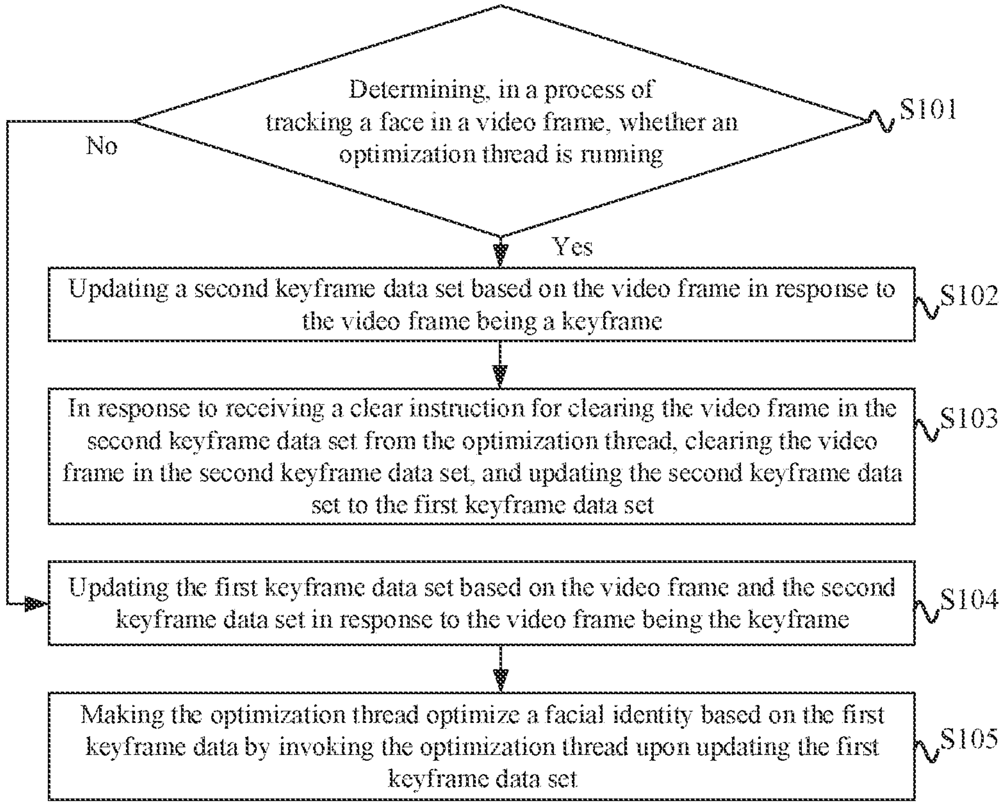
FIG. 1 is a flowchart of processes of a face tracking method according to a first embodiment of the present disclosure.

FIG. 1 is a flowchart of processes of a face tracking method according to a first embodiment of the present disclosure. The embodiment of the present disclosure is applicable to a situation where a tracking thread tracks a face and extracts keyframes in a face tracking process. The face tracking method is performed by a face tracking apparatus according to the embodiments of the present disclosure. The face tracking apparatus is achieved by hardware or software and the face apparatus is integrated in an electronic device according to the embodiments of the present disclosure. As shown in FIG. 1, the face tracking method according to the embodiments of the present disclosure includes the following processes.

In S101, whether an optimization thread is running is determined in a process of tracking a face in a video frame.

In the embodiment of the present disclosure, a face in the video frame is tracked by using the tracking thread and an optimization thread. The tracking thread is a thread configured to acquire face tracking data, such as face posture data, expression data, and a face keypoint, by tracking the face in the video frame of a video. The tracking thread is further configured to detect whether the video frame is a keyframe. The optimization thread is a thread configured to optimize a facial identity vector based on the keyframe detected by the tracking thread. The optimization thread provides an optimized facial identity vector for the tracking thread, and the tracking thread tracks a face in the video frame based on the optimized facial identity vector and detects the keyframe.

Data are interacted between the tracking thread and the optimization thread, such that the tracking thread is able to determine whether the optimization thread is running. For example, the optimization thread is provided with a state identifier. The tracking thread determines, based on the state identifier, whether the optimization thread is running. In response to the optimization thread running, S102 is performed. In response to the optimization thread not running, S104 is performed.

In S102, a second keyframe data set is updated based on the video frame in response to the video frame being a keyframe.

A first keyframe data set $\phi_1$ and the second keyframe data set $\phi_2$ are maintained on the tracking thread in the embodiment of the present disclosure. Each keyframe data set includes a keyframe set, a frame vector of a keyframe, and face tracking data of the keyframe.

In some embodiments, prior to tracking the face in the video, the tracking thread initializes various parameters, such as the facial identity vector, the first keyframe data set $\phi_1$, and the second keyframe data set $\phi_2$. A current facial identity vector is a facial identity vector currently used for tracking the video frame. The tracking thread acquires the face tracking data upon tracking the face in the video frame based on the current facial identity vector. The face tracking data is face posture data, face expression data, and a face keypoint. That is, in the process of tracking the face, in a case that the current facial identity vector $\alpha$ is given, the tracking thread acquires the following face tracking data upon tracking the face in an $i^{th}$ video frame:

$$\{Q_i|P_i,\delta_i\};$$

wherein $Q_i$ represents the face keypoint; $P_i$ represents the posture data; and $\delta_i$ represents the expression data.

In the embodiment of the present disclosure, the optimization thread optimizes the facial identity vector based on the face tracking data of the keyframe in the first keyframe data set, and the first keyframe data set is not updated in the running process of the optimization thread.

In some embodiments of the present disclosure, the tracking thread further maintains a first principal components analysis (PCA) subspace and a second PCA subspace. A PCA subspace is a space composed of frame vectors of all keyframes, an average frame vector, and a feature vector matrix of a keyframe set in a keyframe data set. The first PCA subspace is a space composed of the frame vectors of all keyframes, an average frame vector, and a feature vector matrix of a first keyframe set in the first keyframe data set.

Before the optimization thread is initiated, the first PCA subspace is assigned to the second PCA subspace. Whether a current video frame is a keyframe is detected based on the face tracking data of the current video frame and the second PCA subspace. In a case that the current video frame $F_i$ is the keyframe, the video frame $F_i$ is added as the keyframe to a second keyframe set of the second keyframe data set, and a frame vector of the video frame is added to the second keyframe data set; and the second PCA subspace is updated, that is, $\phi_2=\phi_2 \cup \{F_i\}$; and whether a next video frame is the keyframe is continued to be detected based on the updated second PCA subspace.

In some embodiments, in the process of tracking the face, the tracking thread calculates a frame vector of each video frame based on the expression data δ and a rotation vector in the posture data, and acquires an average frame vector $v_0$ and a feature vector matrix M by performing PCA analysis on the frame vectors of all the keyframes in the first keyframe data set and retaining a variation of 95%. The frame vectors of all the keyframes, the average frame vector $v_0$, and the feature vector matrix M are determined as the first PCA subspace. Upon assigning the first PCA subspace to the second PCA subspace, a distance from a frame vector v of any one video frame to the second PCA subspace is:

$$\mathrm{dis}(v,M)=\|v-(v_0+MM^T(v-v_0))\|.$$

In response to the distance dis (v, M) being less than a predetermined threshold $\varepsilon_1$, the video frame is determined as the keyframe. The video frame is added to the second keyframe set of the second keyframe data set. The frame vector of the keyframe is added to the second keyframe data set, and the second PCA subspace is updated based on the frame vector of the keyframe. In response to the distance dis (v, M) being not less than the predetermined threshold $\varepsilon_1$, a next video frame is tracked.

In practical applications, it is not limited to using a PCA subspace to determine whether the video frame is the keyframe. A person skilled in the art also determines whether the video frame is the keyframe by using other methods, which is not limited in the embodiments of the present disclosure.

In S103, in response to receiving a clear instruction for clearing the video frame in the second keyframe data set from the optimization thread, the video frame in the second keyframe data set is cleared, and the second keyframe data set is updated to the first keyframe data set.

In a case that the optimization thread performs iterative optimization on the facial identity vector, upon each iterative optimization, the optimization thread determines whether the second keyframe set in the second keyframe data set is a non-empty set. In response to the second keyframe set in the second keyframe data set being a non-empty set, it indicates that the tracking thread has tracked the keyframe in the iterative optimization process performed by the optimization thread. The optimization thread sends the instruction for clearing the video frame in the second keyframe data set to the tracking thread. Upon receiving the clear instruction, the tracking thread updates the keyframe in the second keyframe set of the second keyframe data set to the first keyframe set of the first keyframe data set, clears the second keyframe set, and adds the frame vector of the keyframe in the second keyframe set to the first keyframe set, such that the optimization thread that is running performs the iterative optimization on the facial identity vector based on face tracking data of the newly tracked keyframe. In this way, keyframe is added in the running process of the optimization thread; a phenomenon of omission of the keyframe caused by the following fact is avoided: the keyframe has been tracked but cannot be added; and the keyframe adding speed is increased. A plurality of keyframes are added in the running process of the optimization thread, and the number of times of invoking the optimization thread is reduced.

In S104, the first keyframe data set is updated based on the video frame and the second keyframe data set in response to the video frame being the keyframe.

In response to the optimization thread not running, whether the video frame is the keyframe is determined based on the first PCA subspace and the face tracking data. The way to determine whether the video frame is the keyframe is the same as the way to determine whether the video frame is the keyframe based on the second PCA subspace and the face tracking data, which is not described detailed herein.

In response to the video frame being determined as the keyframe, the video frame is added as the keyframe to the first keyframe set of the first keyframe data set, and the frame vector of the video frame is added to the first keyframe data set. At the same time, the frame vector of the video frame is added to the first PCA subspace, and the average frame vector and the feature vector matrix of the first PCA subspace are updated; and a next video frame is tracked. In response to the video being not the keyframe, it is determined whether the second keyframe set of the second keyframe data set is the non-empty set. In response to the second keyframe set of the second keyframe data set being the non-empty set, the keyframe in the second keyframe set is updated to the first keyframe set, and the frame vector of the keyframe in the second keyframe set is updated to the first keyframe data set.

In S105, the optimization thread is made to optimize a facial identity based on the first keyframe data set by invoking the optimization thread upon updating the first keyframe data set.

The update of the first keyframe data set indicates that a new keyframe has been tracked. The second keyframe set of the second keyframe data set is the non-empty set, which also indicates that a new keyframe has been tracked, and the first keyframe data set is also updated. In response to the optimization thread not running and the first keyframe data set being updated, the optimization thread is invoked. The optimization thread optimizes the facial identity vector based on the facial tracking data of the keyframe of the first keyframe data set.

According to the face tracking method of the embodiment of the present disclosure, in the running process of the optimization thread, the second keyframe data set is updated based on the detected keyframe; in response to receiving the instruction from the optimization thread for clearing the video frame in the second keyframe data set, the second keyframe data set is updated to the first keyframe data set, and the video frame in the second keyframe data set is cleared. In response to the optimization thread not running and the video frame being the keyframe, the first keyframe data set is updated based on the video frame and the second keyframe data set. That is, the tracking thread adds the keyframe at any time no matter whether the optimization thread is running. In this way, a large number of keyframes are quickly extracted to optimize the facial identity vector, which increases the convergence speed of the facial identity vector. And it is not necessary to invoke the optimization thread once one keyframe is detected, such that the number of times of invocations of the optimization thread is reduced. The high instantaneity of the real-time facial identity vector optimization is achieved, a few resources are consumed, and more resources are used for achieving a complex optimization algorithm to improve an accuracy of facial identity optimization.

Second Embodiment

Figure 2:
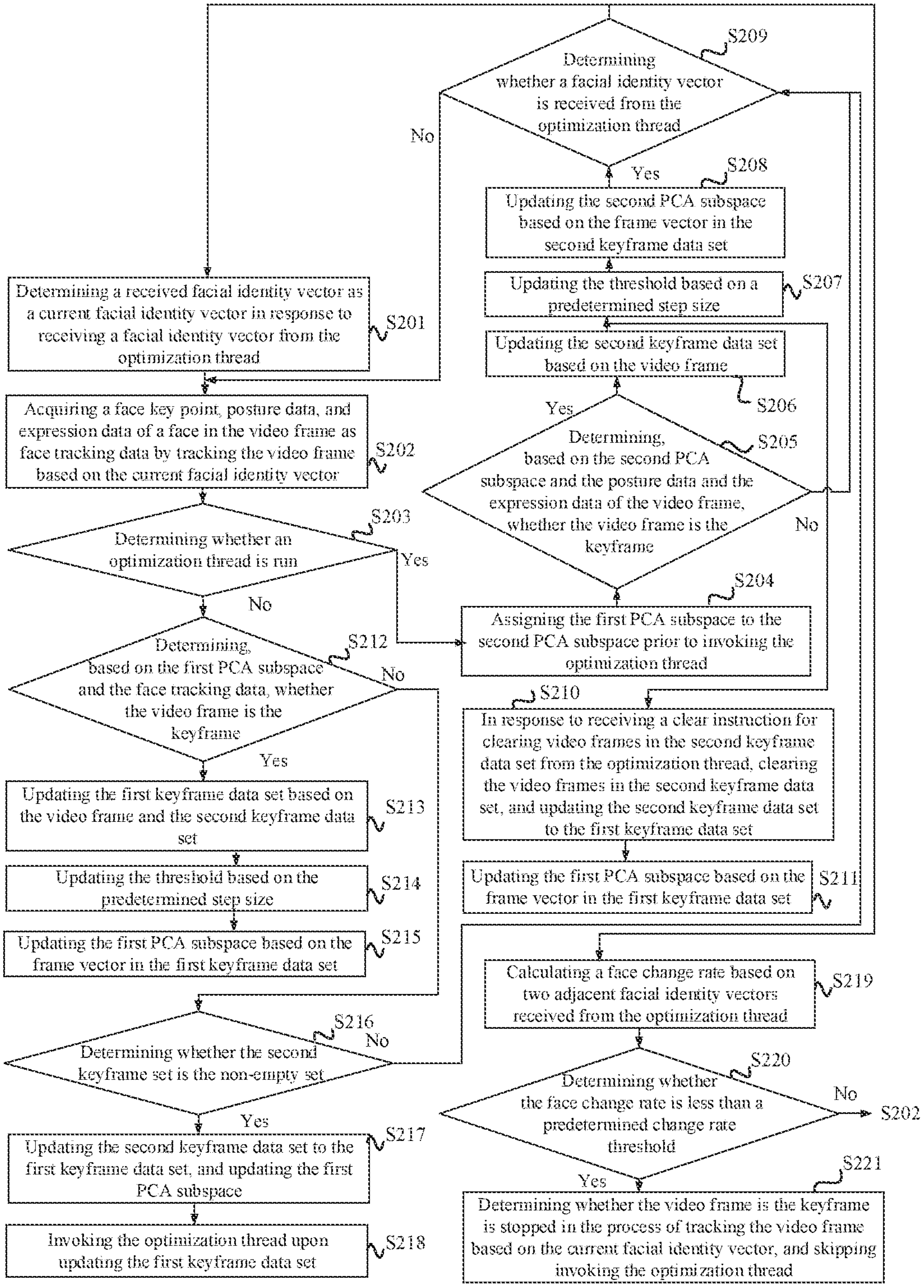
FIG. 2 is a flowchart of processes of a face tracking method according to a second embodiment of the present disclosure.

FIG. 2 is a flowchart of processes of a face tracking method according to a second embodiment of the present disclosure. This embodiment of the present disclosure is explained based on the foregoing first embodiment. As shown in FIG. 2, the face tracking method according to the embodiment of the present disclosure includes the following processes.

In S201, a received facial identity vector is determined as a current facial identity vector in response to receiving a facial identity vector from the optimization thread.

In the embodiment of the present disclosure, the tracking thread provides the keyframe for the optimization thread. The optimization thread optimizes the facial identity vector based on the keyframe. Upon acquiring a converged facial identity vector by performing iterative optimization on the facial identity vector, the optimization thread sends the facial identity vector to the tracking thread. The tracking thread determines the received facial identity vector as the current facial identity vector, and performs the face tracking on the received video frame based on the current facial identity vector.

In S202, a face keypoint, posture data, and expression data of a face in the video frame are acquired as face tracking data by tracking the video frame based on the current facial identity vector.

In some embodiments, prior to tracking the face tracking in the video, the tracking thread initializes various parameters, such as the facial identity vector. The current facial identity vector is a facial identity vector currently used for tracking the video frame. The tracking thread acquires the face tracking data upon tracking the face in the video frame based on the current facial identity vector. The face tracking data is the face posture data, the face expression data, and the face keypoint. That is, in the face tracking process, in the case that the current identity vector $\alpha$ is given, the tracking thread acquires the following face tracking data upon tracking the face tracking in an $i^{th}$ video frame:

$$\{Q_i|P_i,\delta_i\};$$

wherein $Q_i$ represents a face keypoint; $P_i$ represents the posture data; and $\delta_i$ represents the expression data.

In S203, whether the optimization thread is running is determined.

Data are interacted between the tracking thread and the optimization thread, such that the tracking thread acquires whether the optimization thread is running. For example, the optimization thread is provided with a state identifier. The tracking thread determines, based on the state identifier, whether the optimization thread is running. In response to the optimization thread running, S204 is performed. In response to the optimization thread not running, S212 is performed.

In S204, the first PCA subspace is assigned to the second PCA subspace prior to invoking the optimization thread, wherein the first PCA subspace is a space composed of frame vectors of all keyframes, an average frame vector, and a feature vector matrix of a first keyframe set in the first keyframe data set.

In the embodiment of the present disclosure, before the optimization thread is running at each time, the first PCA subspace is assigned to the second PCA subspace. The first PCA subspace is a space composed of the frame vectors of all the keyframes, the average frame vector, and the feature vector matrix of the first keyframe set in the first keyframe data set.

In S205, whether the video frame is the keyframe is determined based on the second PCA subspace and the posture data and the expression data of the video frame.

In some embodiments, a frame vector of the video frame is calculated based on the posture data and the expression data, and a distance between the frame vector of the video frame and the second PCA subspace is calculated. In response to the distance being less than a predetermined threshold, it is determined that the video frame is the keyframe, and S206 is performed. In response to the distance being not less than the predetermined threshold, it is determined that the video frame is not the keyframe, and S209 is performed.

For example, in the face tracking process, the tracking thread calculates a frame vector v of each video frame based on the expression data $\delta$ and rotation vector in posture data of the face in the video frame, and acquires an average frame vector $v_0$ and a feature vector matrix M. M is the first PCA subspace. Upon assigning the first PCA subspace to the second PCA subspace, a distance from a frame vector v of any one video frame to the second PCA subspace is:

$$\mathrm{dis}(v,M)=\|v-(v_0+MM^T(v-v_0))\|;$$

wherein $v_0$ represents the average frame vector in the second PCA subspace; M represents the feature vector matrix in the second PCA subspace. In response to the distance dis(v, M) being less than the predetermined threshold $\varepsilon_1$, it is determined that the video frame is the keyframe; and in response to the distance dis (v, M) being not less than the predetermined threshold $\varepsilon_1$, the video frame is not the keyframe.

In S206, the second keyframe data set is updated based on the video frame.

In some embodiments, the current video frame is added as the keyframe to the second keyframe set of the second keyframe data set, and the face keypoint, the posture data, the expression data, and frame vector of the video frame are added to the second keyframe data set. S207 and S210 are performed. The frame vector of the video frame is calculated based on the posture data and expression data of the video frame and the frame vector is added to the second keyframe data set.

In some other embodiments, the second keyframe set of the second keyframe data set is further provided with an identifier. Whether the identifier of the second keyframe set is a predetermined first identifier is determined. The predetermined first identifier indicates that the second keyframe set is an empty set. For example, the predetermined first identifier is 1, and the first identifier indicates that the second keyframe set is an empty set. In response to the predetermined first identifier being not 1, but 0, it indicates that the second keyframe set is a non-empty set. A detected keyframe is directly added to the second keyframe set without changing the identifier. In response to the identifier of the second keyframe set being the predetermined first identifier which is 1, it indicates that the second keyframe set is an empty set. The identifier of the second keyframe set is set to a predetermined second identifier which is 0 after the keyframe is detected and added to the second keyframe set. By setting the identifier of the second keyframe set, it is convenient for the optimization thread to determine whether the second keyframe set is the non-empty set, such that the optimization thread timely sends, in response to the second keyframe set being the non-empty set, a clear instruction to the tracking thread in the optimization process to combine the first keyframe set with the second keyframe set, and optimizes the facial identity vector based on a newly detected keyframe.

In S207, the threshold is updated based on a predetermined step size.

A dynamic threshold is used in the embodiment of the present disclosure, that is, the threshold is updated in real time. For example:

$$\varepsilon_1 = \varepsilon_1 + \varepsilon_0;$$

wherein $\varepsilon_1$ is the threshold, and $\varepsilon_0$ is the step size, that is, the threshold is updated every time a keyframe is detected. S208 is then performed.

In S208, the second PCA subspace is updated based on the frame vector in the second keyframe data set.

Upon adding the frame vector, the face keypoint, the posture data, and the expression data of the video frame to the second keyframe data set, the frame vector of the video frame is added to the second PCA subspace. The average frame vector and the feature vector matrix of the second PCA subspace are recalculated to update the second PCA subspace. Whether a next video frame is the keyframe is continued to be determined based on the updated second PCA subspace. Whether a video frame is the keyframe is determined based on the first PCA subspace after the running of the optimization thread is ended.

In S209, whether a facial identity vector is received from the optimization thread is determined.

The tracking thread needs to track a next video frame upon tracking one video frame. Before the tracking of the next video frame, whether a facial identity vector is received from the optimization thread is determined. In response to receiving the facial identity vector from the optimization thread, it indicates that the facial identity vector is optimized and updated, and S201 is re-performed to determine the received facial identity vector as the current facial identity vector.

In response to failing to receive the facial identity vector from the face optimization thread, S202 is re-performed, which indicates that the facial identity vector is not updated and optimized, and the next video frame is continued to be tracked based on the current facial identity vector.

In S210, in response to receiving a clear instruction for clearing video frames in the second keyframe data set from the optimization thread, the video frame in the second keyframe data set is cleared, and the second keyframe data set is updated to the first keyframe data set.

In the case that the optimization thread performs iterative optimization on the facial identity vector, upon each iterative optimization, the optimization thread determines whether the second keyframe set of the second keyframe data set is the non-empty set. In response to the second keyframe set of the second keyframe data set being the non-empty set, it indicates that the tracking thread has tracked the keyframe in the iterative optimization process of the optimization thread. The optimization thread sends the instruction for clearing the second keyframe set to the tracking thread. Upon receiving the instruction for clearing the second keyframe set, the tracking thread updates the tracked keyframe in the second keyframe set to the first keyframe set, and clears the second keyframe set, such that the optimization thread that is running performs the iterative optimization on the facial identity vector based on the newly tracked keyframe. In this way, the keyframe is added in the running process of the optimization thread; a phenomenon of omission of the keyframe caused by the following fact is avoided: the keyframe has been tracked but cannot be added; and the keyframe adding speed is increased. And a plurality of keyframes are added in the running process of the optimization thread, and the number of times of invoking the optimization thread is reduced.

In S211, the first PCA subspace is updated based on the frame vector in the first keyframe data set.

Upon the frame vector in the second keyframe data set is added to the first keyframe data set, the added frame vector is added to the first PCA subspace, and an average frame vector and a feature vector matrix of the first PCA subspace are recalculated to update the first PCA subspace.

In S212, whether the video frame is the keyframe is determined based on the first PCA subspace and the face tracking data.

In response to the optimization thread not running, the frame vector of the video frame is calculated based on the posture data and the expression data of the face in the video frame, and a distance between the frame vector of the video frame and the first PCA subspace is calculated. In response to the distance being less than the predetermined threshold, it is determined that the video frame is the keyframe, and S213 is performed; and in response to the distance being greater than or equal to the predetermined threshold, it is determined that the video frame is not the keyframe, and S216 is performed.

Whether the video frame is the keyframe is determined based on the first PCA subspace and the face tracking data, which is referred to S205 and is not detailed herein.

In S213, the first keyframe data set is updated based on the video frame and the second keyframe data set.

In response to the optimization thread not running and the video frame being detected as the keyframe, the video frame is added to the first keyframe set of the first keyframe data set, and the frame vector, the face keypoint, the posture data, and the expression data of the video frame are added to the first keyframe data set. The keyframe in the second keyframe set of the second keyframe data set is added to the first keyframe set, and the frame vector, the face keypoint, the posture data, and the expression data of the keyframe in the second keyframe data set are added to the first keyframe data set.

In S214, the threshold is updated based on the predetermined step size.

For example:

$$\varepsilon_1 = \varepsilon_1 + \varepsilon_0;$$

wherein $\varepsilon_1$ is the threshold, and $\varepsilon_0$ is the step size, that is, the threshold is updated every time a keyframe is detected.

In S215, the first PCA subspace is updated based on the frame vector in the first keyframe data set.

As the frame vector of the detected keyframe is added to the first keyframe data set or the frame vector of the keyframe in the second keyframe data set is added to the first keyframe data set, the newly added frame vector is added to the first PCA subspace, and the average frame vector and the feature vector matrix are calculated based on the frame vector in the first PCA subspace to update the first PCA subspace.

In S216, whether the second keyframe set is the non-empty set is determined.

In response to the tracking thread detecting that the current video frame is not the keyframe, the tracking thread determines whether the second keyframe set is the non-empty set. In response to the second keyframe set being the non-empty set, S217 is performed. In response to the second keyframe set being the empty set, S209 is re-performed.

In S217, the second keyframe data set is updated to the first keyframe data set, and the first PCA subspace is updated.

The keyframe in the second keyframe set in the second keyframe data set is added to the first keyframe set, and the frame vector, the face keypoint, the posture data, and the expression data of the keyframe in the second keyframe data set are added to the first keyframe data set. The first PCA subspace is updated based on the newly added frame vector, and whether a next video frame is the keyframe is continued to be detected based on the updated first PCA subspace.

In S218, the optimization thread is invoked upon updating the first keyframe data set.

In the embodiment of the present disclosure, in response to the optimization thread not running and the optimization thread being invoked upon updating the first keyframe set, the optimization thread optimizes the facial identity vector based on the posture data and expression data of the keyframe in the first keyframe data set.

In S219, a face change rate is calculated based on two adjacent facial identity vectors received from the optimization thread.

The optimization thread sends the optimized facial identity vector to the tracking thread upon each invocation. It is assumed that F(α) is a face mesh corresponding to the facial identity vector α and s is a diagonal length of a minimum circumscribed rectangle of the three-dimensional average face. In a case that the two adjacent facial identity vectors are changed from $\alpha_1$ to $\alpha_2$, the face change rate is calculated as follows:

$$\frac{\max_j \|(F(\alpha_1) - F(\alpha_2))^j\|}{s};$$

That is, the face change rate is acquired by dividing a maximum movement amount among j vertexes of the face mesh by the diagonal length of the minimum circumscribed rectangle of the three-dimensional average face.

In S220, whether the face change rate is less than a predetermined change rate threshold is determined.

The face change rate is determined as follows:

$$\frac{\max_j \|(F(\alpha_1) - F(\alpha_2))^j\|}{s} < \varepsilon;$$

In response to the above formula being true, S221 is performed, and in response to the above formula being not true, S202 is re-performed to continue to extract the keyframe in the face tracking process, such that the optimization thread uses more keyframes to optimize the facial identity vector.

In S221, determining whether the video frame is the keyframe is stopped in the process of tracking the video frame based on the current facial identity vector, and the invocation of the optimization thread is skipped.

In response to the face change rate being less than the predetermined change rate threshold, the facial identity vector has already converged, and the tracking thread tracks the video frame based on the current facial identity vector, and keyframes are not detected in the tracking process, that is, the processes from S203 to S221 are not performed.

According to the face tracking method of the embodiment of the present disclosure, in the running process of the optimization thread, the second keyframe data set is updated based on the detected keyframe; in response to receiving the instruction from the optimization thread for clearing the video frame in the second keyframe data set, the second keyframe data set is updated to the first keyframe data set, and the video frame in the second keyframe data set is cleared. In response to the optimization thread not running and the video frame being the keyframe, the first keyframe data set is updated based on the video frame and the second keyframe data set. That is, the tracking thread adds the keyframe at any time no matter whether the optimization thread is running. In this way, a large number of keyframes are quickly extracted to optimize the facial identity vector, which increases the convergence speed of the facial identity vector. And it is not necessary to invoke the optimization thread once one keyframe is detected, such that the number of times of invocations of the optimization thread is reduced. The high instantaneity of the real-time facial identity vector optimization is achieved, a few resources are consumed, and more resources are used for achieving a complex optimization algorithm to improve an accuracy of facial identity optimization.

In response to receiving the instruction for clearing the second keyframe set from the optimization thread, the second keyframe data set is updated to the first keyframe data set, and the second keyframe set in the second keyframe data set is cleared, such that the optimization thread uses the newly detected keyframe to optimize the facial identity vector in the iteration process. The newly detected keyframe is used to optimize the facial identity vector without invoking the optimization thread again upon the end of the optimization performed by the optimization thread, which reduces the number of times of invocations of the optimization thread.

The threshold is updated based on the predetermined step size every time a new keyframe is detected. As the number of keyframes increases, the threshold gradually increases, and the video frame is less likely to be detected as the keyframe, such that an updating frequency of the first keyframe set in the first keyframe data set decreases, and the number of times of invocations of the optimization thread decreases.

Third Embodiment

Figure 3:
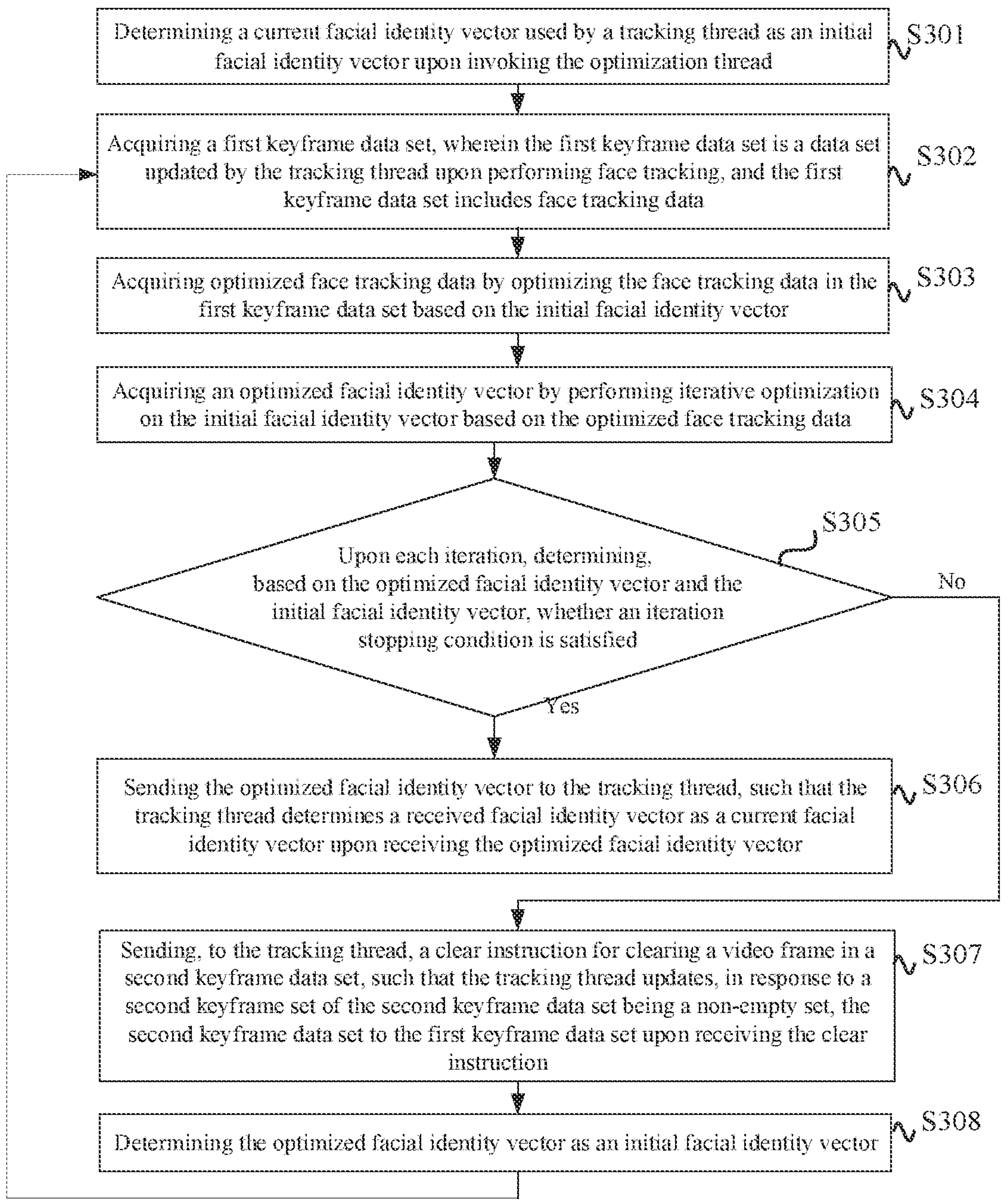
FIG. 3 is a flowchart of processes of a face tracking method according to a third embodiment of the present disclosure.

FIG. 3 is a flowchart of processes of a face tracking method according to a third embodiment of the present disclosure. The embodiment of the present disclosure is applicable to a situation where an optimization thread optimizes a facial identity vector. The face tracking method is performed by a face tracking apparatus according to the embodiments of the present disclosure. The face tracking apparatus is implemented by hardware or software and the face tracking apparatus is integrated in an electronic device according to the embodiments of the present disclosure. As shown in FIG. 3, the face tracking method according to the embodiments of the present disclosure includes the following processes.

In S301, a current facial identity vector used by a tracking thread is determined as an initial facial identity vector upon invoking the optimization thread.

Upon invoking the optimization thread, the current facial identity vector used by the tracking thread is acquired, and the current facial identity vector is determined as an optimized initial facial identity vector. In one example, the optimization thread determines a facial identity vector that is output to the tracking thread at the last time as the initial facial identity vector.

In S302, a first keyframe data set is acquired, wherein the first keyframe data set is a data set updated by the tracking thread upon performing face tracking, and the first keyframe data set includes face tracking data.

The tracking thread maintains the first keyframe data set, wherein the first keyframe data set includes face tracking data of all keyframes detected prior to invoking the optimization thread, and the face tracking data includes a face keypoint, posture data, and expression data.

In S303, optimized face tracking data is acquired by optimizing the face tracking data in the first keyframe data set based on the initial facial identity vector.

In some embodiments of the present disclosure, a three-dimensional face model is constructed based on the initial facial identity vector and the expression data, and a face keypoint of the three-dimensional face model is acquired. Optimized posture data and optimized expression data are acquired as the optimized face tracking data by solving optimal posture data and optimal expression data based on the face keypoint of the three-dimensional face model and the face keypoint in the face tracking data.

S304, an optimized facial identity vector is acquired by performing iterative optimization on the initial facial identity vector based on the optimized face tracking data.

In one example, a face size of a tracked face is calculated based on the face keypoint; an expression weight of each keyframe is calculated based on the expression data of each keyframe; an optimization equation is established based on the face tracking data, the face size, the expression weight, the current facial identity vector, and the initial facial identity vector; and the optimized facial identity vector is acquired by iteratively solving the optimization equation.

In S305, upon each iteration, whether an iteration stop condition is satisfied is determined based on the optimized facial identity vector and the initial facial identity vector.

A face change rate is calculated based on the optimized facial identity vector and the initial facial identity vector. In response to the face change rate being less than a predetermined threshold, the iteration is stopped, and the optimized facial identity vector is determined as a result of optimization of current invocation. S306 is performed in response to the iteration stop condition being satisfied, and S307 is performed in response to the iteration stop condition being not satisfied.

In S306, the optimized facial identity vector is sent to the tracking thread, such that the tracking thread determines a received facial identity vector as a current facial identity vector upon receiving the optimized facial identity vector.

In response to acquiring the optimized facial identity vector upon the stopping of the iterative optimization of the optimization thread in one invocation, the facial identity vector is sent to the tracking thread. The tracking thread receives the facial identity vector and determines the facial identity vector as the current facial identity vector.

In S307, a clear instruction for clearing a video frame in a second keyframe data set is sent to the tracking thread, such that the tracking thread updates, in response to a second keyframe set of the second keyframe data set being a non-empty set, the second keyframe data set to the first keyframe data set upon receiving the clear instruction.

In response to the iteration stop condition being not satisfied and the tracking thread having detected a new keyframe and added the new keyframe to the second keyframe set of the second keyframe data set, the instruction for clearing the second keyframe set is sent to the tracking thread upon ending each iteration, such that the tracking thread adds the keyframe in the second keyframe set to the first keyframe set and clears the second keyframe set, and the tracking thread uses the newly detected keyframe to optimize the facial identity vector in the next optimization.

In S308, the optimized facial identity vector is determined as an initial facial identity vector.

Upon each iterative optimization, in response to the iteration stop condition being not satisfied, the optimization thread determines the optimized facial identity vector acquired in the current optimization iteration as the initial facial identity vector of a next iteration, and S302 is re-performed to continue to perform iterative optimization on the facial identity vector.

According to the face tracking method of the embodiments of the present disclosure, upon invoking the optimization thread, the current facial identity vector used by the tracking thread is determined as the initial facial identity vector, the first keyframe data set is acquired, and the optimized face tracking data is acquired by optimizing the face tracking data in the first keyframe data set based on the initial facial identity vector. The optimized facial identity vector is acquired by performing the iterative optimization on the initial facial identity vector based on the optimized face tracking data, and upon each iteration, whether the iteration stop condition is satisfied is determined based on the optimized facial identity vector and the initial facial identity vector. In response to the iteration stop condition being satisfied, the optimized facial identity vector is sent to the tracking thread, such that the tracking thread determines the received facial identity vector as the current facial identity vector in response to receiving the optimized facial identity vector. In response to the iteration stop condition being not satisfied, the clear instruction for clearing the video frames in the second keyframe data set is sent to the tracking thread, such that the tracking thread updates, in response to the second keyframe set of the second keyframe data set being the non-empty set, the second keyframe set to the first keyframe set upon receiving the clear instruction. The optimized facial identity vector is determined as the initial facial identity vector to continue to optimize the facial identity vector. Thus, the optimization thread uses the keyframe newly added to the second keyframe set to optimize the facial identity vector in the iterative optimization process, and it is not necessary to add a new keyframe to optimize the facial identity vector until each invocation of the optimization thread is ended. In this way, a large number of keyframes are quickly extracted to optimize the facial identity vector, which increases the convergence speed of the facial identity vector. And it is not necessary to invoke the optimization thread once one keyframe is detected, such that the number of times of invocations of the optimization thread is reduced. The high instantaneity of the real-time facial identity vector optimization is achieved, a few resources are consumed, and more resources are used for achieving a complex optimization algorithm to improve the accuracy of facial identity optimization.

Fourth Embodiment

Figure 4:
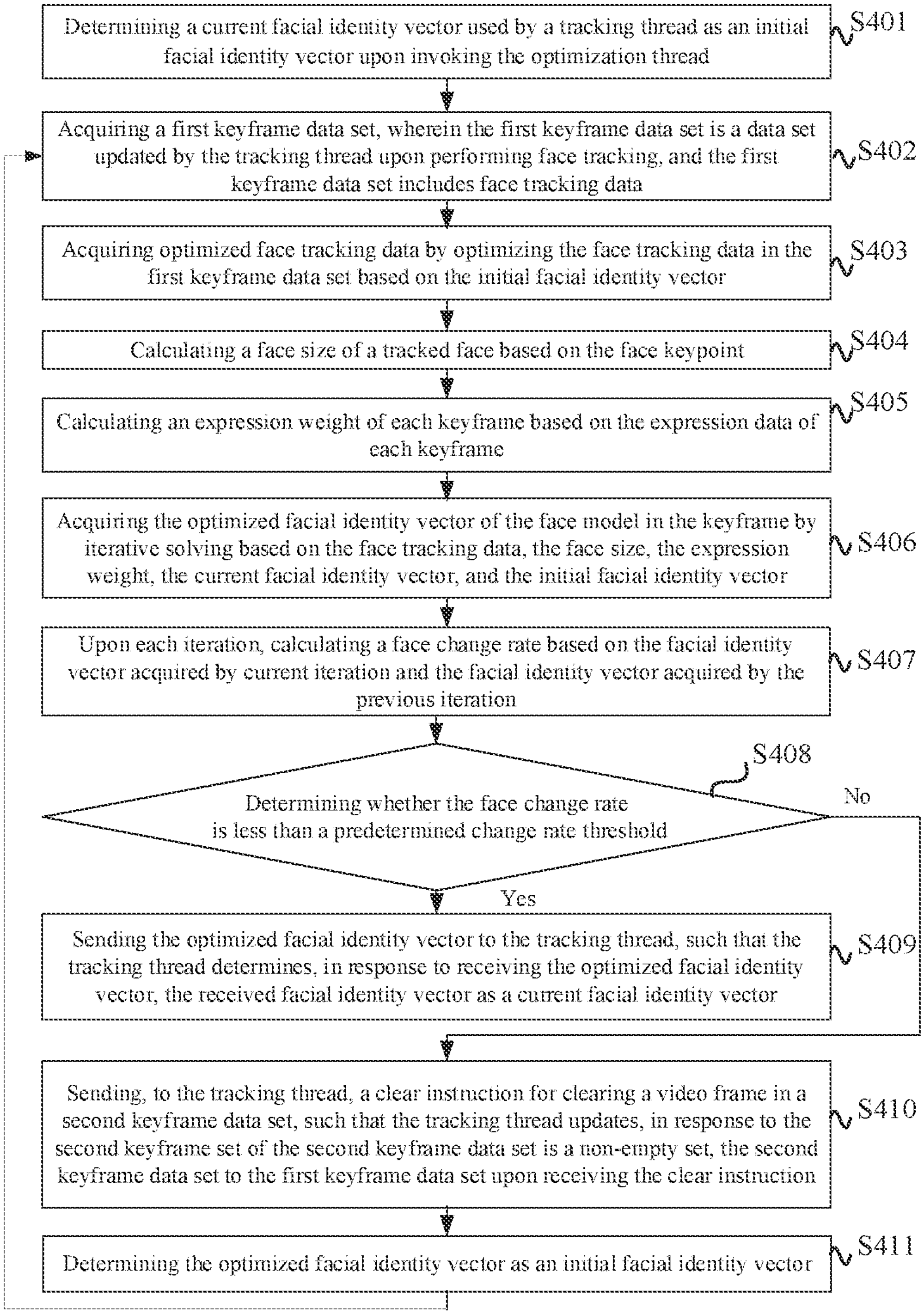
FIG. 4 is a flowchart of processes of a face tracking method according to a fourth embodiment of the present disclosure.

FIG. 4 is a flowchart of processes of a face tracking method according to a fourth embodiment of the present disclosure. This embodiment of the present disclosure is described based on the foregoing third embodiment. As shown in FIG. 4, the face tracking method according to the embodiments of the present disclosure includes the following processes.

In S401, a current facial identity vector used by a tracking thread is determined as an initial facial identity vector upon invoking the optimization thread.

For example, the current facial identity vector is $\alpha_{pre}$. Before one invocation of the optimization thread is ended, the tracking thread tracks a face in a received video frame based on the current facial identity vector $\alpha_{pre}$.

In S402, a first keyframe data set is acquired, wherein the first keyframe data set is a data set updated by the tracking thread upon performing face tracking, and the first keyframe data set includes face tracking data.

In S403, optimized face tracking data is acquired by optimizing the face tracking data in the first keyframe data set based on the initial facial identity vector.

In some embodiments, a three-dimensional face model is constructed based on the initial facial identity vector and the expression data, and a face keypoint of the three-dimensional face model is acquired. Optimized posture data and optimized expression data are acquired as the optimized face tracking data by solving optimal posture data and optimal expression data based on the face keypoint of the three-dimensional face model and the face keypoint in the face tracking data.

In a case that a facial identity vector $\alpha$ is given, the three-dimensional face model $F_i$ of an $i^{th}$ video frame is expressed as:

$$F_i=F_i(\alpha,\delta)=C_0+C_{exp}\delta \quad (1)$$

wherein $C_0$ represents an expressionless neutral face of a user; $C_{exp}$ represents an expression shape fusion deformer for the user; and $\delta$ represents face expression data.

For a PCA three-dimensional face model:

$$F_i=F_i(\alpha,\delta)=B+B_{ID}\alpha+B_{exp}(\alpha)\delta \quad (2)$$

It is possible to provide that:

$$C_0=B+B_{ID}\alpha,\ C_{exp}=B_{exp}(\alpha);$$

wherein B represents an average face; $B_{ID}$ represents an identity shape fusion deformer of the user; and $B_{exp}$ represents an expression shape fusion deformer designed for the average face B. B, $B_{ID}$, and $B_{exp}$ are predetermined.

For a bilinear three-dimensional face model:

$$F_i=F_i(\alpha,\delta)=C\otimes_2\alpha\otimes_3\delta \quad (3)$$

wherein C represents the expressionless neutral face of the user, and $\otimes_2$ represents a modal product.

Optimal $P_i,\delta_i$ is acquired by solving the following optimization equation (4) based on an input face keypoint $Q_i$:

$$\left(P_i^k,\ \delta_i^k\right)=\operatorname{argmin}\left(\sum\nolimits_j\left\|\prod\nolimits_{P_i}\left(C_0^{k-1}+C_{exp}^{k-1}\delta_i\right)^j-Q_i^j\right\|+\gamma\|(P_i,\ \delta_i)\|\right) \quad (4)$$

wherein k represents a $k^{th}$ iteration;

$$C_0^{k-1}$$

represents a neutral face used in the $k^{th}$ iteration;

$$C_{exp}^{k-1}$$

represents an expression shape fusion deformer used in the $k^{th}$ iteration; $\Pi_{P_i}(\bullet)$ represents j keypoints acquired by projecting the three-dimensional face $(C_0+C_{exp}\delta_i)^j$; $Q_i$ represents a face keypoint directly extracted using a face keypoint extraction algorithm in the tracking thread; and $\gamma$ represents a parameter. Optimal $P_i,\delta_i$ is acquired after a minimum value is solved in the above equation (4), that is, the following face tracking data is acquired after the tracking thread performs face tracking on the $i^{th}$ video frame:

$\{Q_i|P_i,\delta_i\}$;

wherein $Q_i$ represents a face keypoint; $P_i$ represents the posture data; and $\delta_i$ represents the expression data.

In S404, a face size of a tracked face is calculated based on the face keypoint.

A minimum circumscribed rectangular frame of the face is determined based on the face keypoint, and a face size f 1 of the face is calculated based on the face keypoint on the minimum circumscribed rectangular frame.

In S405, an expression weight of each keyframe is calculated based on the expression data of each keyframe.

In some embodiments, the first keyframe set includes a plurality of keyframes. The expression data of each of the keyframes is acquired upon tracking the face in the plurality of keyframes, such that minimum expression data is determined from the expression data of all the keyframes; and the expression weight of each of the keyframes is calculated based on a predetermined constant term, the minimum expression data, and the expression data of the keyframe, wherein the expression weight of the keyframe is negatively correlated with the expression data of the keyframe, as shown in the following formula:

The expression weight of each of the keyframes is calculated according to the following formula:

$$w_i^k=\frac{r}{r+\left\|\delta_i^k\right\|-\min_{i\in I}\left(\left\|\delta_i^k\right\|\right)} \quad (5)$$

wherein $$w_i^k$$

represents an expression weight of a keyframe i in the $k^{th}$ iteration; r represents a constant;

$$\delta_i^k$$

represents expression data of the keyframe i in the $k^{th}$ iteration; l represents the first keyframe set; and $$\min_{i\in I}\left(\left\|\delta_i^k\right\|\right)$$

represents the minimum expression data among all the keyframes.

According to the above formula (5), it is seen that the larger facial expression in a keyframe, the smaller $$w_i^k.$$

On the contrary, the smaller facial expression, the larger $$w_i^k.$$

In this way, the influence of the large-expression face on the facial identity vector is reduced.

In S406, the optimized facial identity vector of the face model in the keyframe is acquired by iterative solving based on the face tracking data, the face size, the expression weight, the current facial identity vector, and the initial facial identity vector.

In some embodiments of the present disclosure, an optimization equation is established as follows:

$$(\alpha, \{P_i, \delta_i\}_{i\in I}) = argmin\Big(\sum_{i\in I} w_i \sum_j \Big\| \prod_{P_i} (F_i(\alpha, \delta_i))^j - Q_i^j \Big\| + \beta_1 \sum_{i\in I} w_i f_i \|\alpha\| + \beta_2 \|\alpha - \alpha_{pre}\| + \gamma \sum_{i\in I} w_i \|(P_i, \delta_i)\|\Big) \tag{6}$$

wherein I represents the first keyframe set; $\beta_1$, $\beta_2$, and $\gamma$ represent parameters that are predetermined; and $\alpha_{pre}$ represents the current facial identity vector used by the tracking thread.

In one embodiment of the present disclosure, for the bilinear three-dimensional face model $F_i=F_i(\alpha,\delta)=C\vartheta_2\alpha\vartheta_3\delta$, the formula for iteratively optimizing the facial identity vector $\alpha^k$ is as follows:

$$\alpha^k = \text{argmin}\Big(\sum_{i\in I} w_i^k \sum_j \Big\| \prod_{P_i^k} (C \otimes_2 \alpha \otimes_3 \delta_i^k)^j - Q_i^j \Big\| + \beta_1 \sum_{i\in I} w_i^k f_i \|\alpha\| + \beta_2 \|\alpha - \alpha_{pre}\|\Big) \tag{7}$$

In another embodiment, for the PCA three-dimensional face model $F_i=F_i(\alpha,\delta)=B+B_{ID}\alpha+B_{exp}(\alpha)\delta$, the formula for iteratively optimizing the facial identity vector $\alpha^k$ is as follows:

$$\alpha^k = \text{argmin}\Big(\sum_{i\in I} w_i^k \sum_j \Big\| \prod_{P_i^k} \big(B + B_{ID}\alpha + B_{exp}(\alpha^{k-1})\delta_i^k\big)^j - Q_i^j \Big\| + \beta_1 \sum_{i\in I} w_i^k f_i \|\alpha\| + \beta_2 \|\alpha - \alpha_{pre}\| + \beta_3 \|\alpha - \alpha^{k-1}\|\Big) \tag{8}$$

wherein I represents the first keyframe set; $\beta_1$, $\beta_2$, and $\beta_3$ represent parameters that are predetermined; and $\alpha_{pre}$ represents the current facial identity vector used by the tracking thread.

In the above equation (7) and equation (8):

The face size $f_i$ is introduced into a regular term $$\beta_1 \sum_{i\in I} w_i^k f_i \|\alpha\|,$$

such that the parameter $\beta_1$ is self-adapted to different face sizes; a smooth term $\beta_2\|\alpha-\alpha_{pre}\|$ of the facial identity vector is introduced, such that the overall convergence speed of the facial identity vector is reduced, but the sudden shaking of the face, upon updating the facial identity vector in the tracking thread, is prevented in a special application scene, such as a face change; $\beta_3\|\alpha-\alpha^{k-1}\|$ is introduced in the optimization process; and $B_{exp}(\alpha^{k-1})$ is used to approximate $B_{exp}(\alpha^k)$, such that the optimization equation (6) is applicable to both the PCA three-dimensional face model and the bilinear three-dimensional face model; and in the optimization process, the weight $w_i$ of each of the keyframes is dynamically calculated, such that the weight of the large-expression face is reduced, and the influence of a large expression on the facial identity vector is reduced.

In S407, upon each iteration, a face change rate is calculated based on the facial identity vector acquired by current iteration and the facial identity vector acquired by the previous iteration.

An optimized facial identity vector $\alpha^k$ and a facial identity vector $\alpha^{k-1}$ of the previous iteration are acquired after each iteration is ended, and the face change rate is calculated according to the following formula:

$$\frac{\max_j \|(F(\alpha^k) - \alpha^{k-1}))^j\|}{s};$$

wherein $F(\alpha)$ represents a face mesh corresponding to the facial identity vector $\alpha$, and s represents a diagonal length of a minimum circumscribed rectangle of the three-dimensional average face, that is, the face change rate is acquired by dividing a maximum movement amount among j vertexes of the face mesh by the diagonal length of the minimum circumscribed rectangle of the three-dimensional average face.

In S408, whether the face change rate is less than a predetermined change rate threshold is determined.

That is:

$$\frac{\max_j \|(F(\alpha^k) - \alpha^{k-1}))^j\|}{s} < \varepsilon;$$

In response to the above formula being true, it is determined that an iterative solving stop condition is satisfied, and S409 is performed. In response to determining that the iterative solving stop condition is not satisfied, S410 is performed.

In S409, the optimized facial identity vector is sent to the tracking thread, such that the tracking thread determines, in response to receiving the optimized facial identity vector, the received facial identity vector as a current facial identity vector.

The optimized facial identity vector $\alpha^k$ is sent to the tracking thread, such that the tracking thread determines, in response to receiving the optimized facial identity vector $\alpha^k$, the received facial identity vector $\beta^k$ as the current facial identity vector to track a video frame.

In some embodiments, the optimization thread further calculates a new user face $$C_0^k$$

and a new user face expression shape mixer $$C_{exp}^{k}$$

based on the optimized facial identity vector $\alpha^k$, and tracks a video frame based on the optimized facial identity vector $\alpha^k$, the user face $$C_0^k$$

and the user face expression shape mixer $$C_{exp}^{k}.$$

The frame vector of each of the keyframes is also updated based on the expression data and posture data of the optimized keyframe in the first keyframe data set; and a first PCA subspace is updated based on the frame vector of each of the keyframes, such that the first PCA subspace is more accurate, and the keyframe is more accurately detected based on the first PCA subspace.

In S410, a clear instruction for clearing a video frame in a second keyframe data set is sent to the tracking thread, such that the tracking thread updates, in response to the second keyframe set of the second keyframe data set being a non-empty set, the second keyframe data set to the first keyframe data set upon receiving the clear instruction.

In S411, the optimized facial identity vector is determined as an initial facial identity vector, and S402 is re-performed.

According to the face tracking method of the embodiments of the present disclosure, upon each iteration, whether the iteration stop condition is satisfied is determined based on the optimized facial identity vector and the initial facial identity vector. In response to the iteration stop condition being satisfied, the optimized facial identity vector is sent to the tracking thread, such that the tracking thread determines the received facial identity vector as the current facial identity vector. In response to the iteration stop condition being not satisfied, the clear instruction for clearing the video frame of the second keyframe data set is sent to the tracking thread, such that upon receiving the clear instruction, the tracking thread updates, in response to the second keyframe set being the non-empty set, the second keyframe set to the first keyframe set, and clears the second keyframe set. The optimized facial identity vector is determined as the initial facial identity vector, and the optimized facial identity vector is continued to be iteratively solved. Thus, the optimization thread uses the keyframe newly added to the second keyframe set to optimize the facial identity vector in the iterative optimization process, and it is not necessary to add a new keyframe to optimize the facial identity vector until each invocation of the optimization thread is ended. In this way, a large number of keyframes are quickly extracted to optimize the facial identity vector, which increases the convergence speed of the facial identity vector. And it is not necessary to invoke the optimization thread once one keyframe is detected, such that the number of times of invocations of the optimization thread is reduced. The high instantaneity of the real-time facial identity vector optimization is achieved, a few resources are consumed, and more resources are used for achieving a complex optimization algorithm to improve the accuracy of facial identity optimization.

The face size $f_i$ is introduced into the optimization equation, such that self-adaptation to different face sizes is achieved. The smooth term $\beta_2\|\alpha-\alpha_{pre}\|$ of the facial identity vector is introduced, such that although the overall convergence speed of the facial identity vector is reduced, the sudden shaking of the face upon updating the facial identity vector in the tracking thread is prevented in special application scenes, such as the face change. $\beta_3\|\alpha-\alpha^{k-1}\|$ is introduced in the optimization process, and $B_{exp}(\alpha^{k-1})$ is used to approximate $B_{exp}(\alpha^k)$, such that the optimization equation is applicable to both the PCA three-dimensional face model and the bilinear three-dimensional face model. In the optimization process, the expression weight of each of the keyframes is dynamically calculated, such that the weight of the large-expression face is reduced, and the influence of a large expression on the facial identity vector is reduced.

Fifth Embodiment

Figure 5:
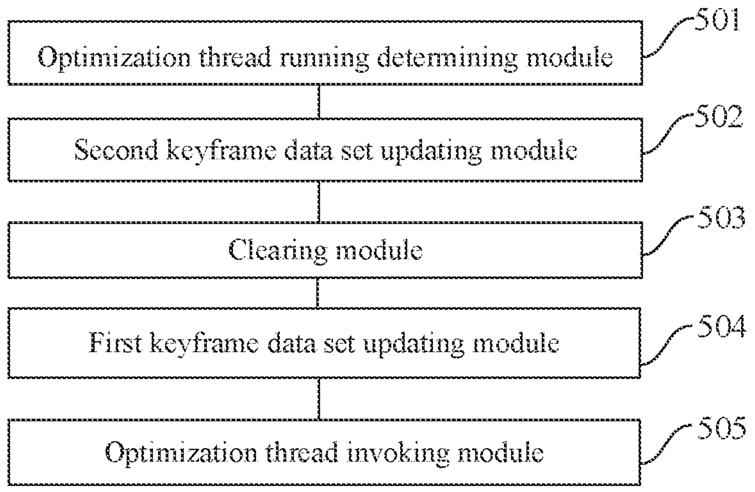
FIG. 5 is a block diagram of a structure of a face tracking apparatus according to a fifth embodiment of the present disclosure.

FIG. 5 is a block diagram of a structure of a face tracking apparatus according to a fifth embodiment of the present disclosure. As shown in FIG. 5, the face tracking apparatus of the embodiment of the present disclosure is applicable to a tracking thread. A first keyframe data set and a second keyframe data set are maintained on the tracking thread, and the face tracking apparatus includes:

an optimization thread running determining module 501, configured to determine, in a process of tracking a face in a video frame, whether an optimization thread is running; a second keyframe data set updating module 502, configured to, in response to the optimization thread running and the video frame being a keyframe, update the second keyframe data set based on the video frame; a clearing module 503, configured to, in response to receiving a clear instruction for clearing a video frame in the second keyframe data set from the optimization thread, clear the video frame in the second keyframe data set, and update the second keyframe data set to the first keyframe data set; a first keyframe data set updating module 504, configured to, in response to the optimization thread not running and the video frame being the keyframe, update the first keyframe data set based on the video frame and the second keyframe data set; and an optimization thread invoking module 505, configured to make the optimization thread optimize a facial identity based on the first keyframe data set by invoking the optimization thread upon updating the first keyframe data set.

The face tracking apparatus according to the embodiment of the present disclosure performs the face tracking methods according to the first embodiment and the second embodiment of the present disclosure, and the face tracking apparatus has corresponding functional modules and effects for performing the face tracking method.

Sixth Embodiment

Figure 6:
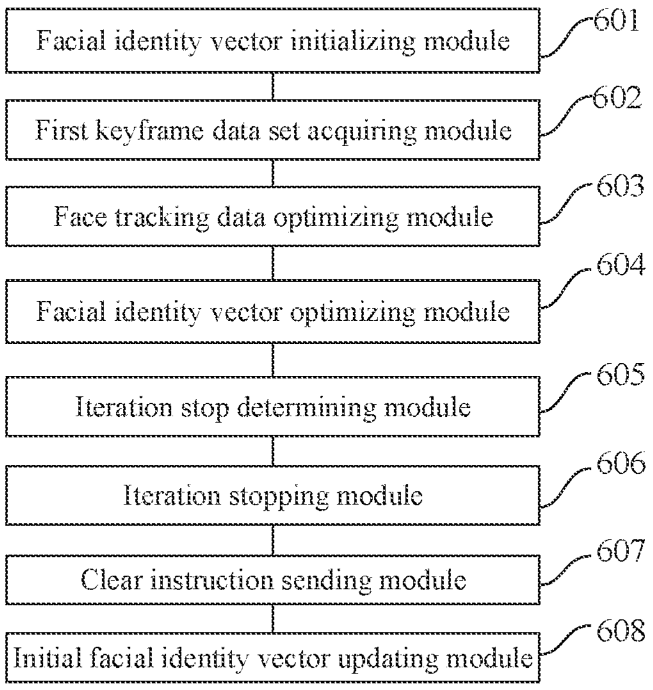
FIG. 6 is a block diagram of a structure of a face tracking apparatus according to a sixth embodiment of the present disclosure.

FIG. 6 is a block diagram of a structure of a face tracking apparatus according to a sixth embodiment of the present disclosure. As shown in FIG. 6, the face tracking apparatus according to the embodiment of the present disclosure is applicable to an optimization thread, and includes the following modules:

a facial identity vector initializing module 601, configured to determine a current facial identity vector used by a tracking thread as an initial facial identity vector upon invoking the optimization thread; a first keyframe data set acquiring module 602, configured to acquire a first keyframe data set, wherein the first keyframe data set is a data set updated by the tracking thread upon performing face tracking, and the first keyframe data set includes face tracking data; a face tracking data optimizing module 603, configured to acquire optimized face tracking data by optimizing the face tracking data in the first keyframe data set based on the initial facial identity vector; a facial identity vector optimizing module 604, configured to acquire an optimized facial identity vector by performing iterative optimization on the initial facial identity vector based on the optimized face tracking data; an iteration stop determining module 605, configured to, upon each iteration, determine, based on the optimized facial identity vector and the initial facial identity vector, whether an iteration stop condition is satisfied; an iteration stopping module 606, configured to, in response to the iteration stop condition being satisfied, make the tracking thread determine, in response to receiving the optimized facial identity vector, a received facial identity vector as the current facial identity vector by sending the optimized facial identity vector to the tracking thread; a clear instruction sending module 607, configured to, in response to the iteration stop condition being not satisfied, make the tracking thread update, in response to a second keyframe set of the second keyframe data set being a non-empty set, the second keyframe data set to the first keyframe data set upon receiving the clear instruction by sending the clear instruction for clearing video frame in a second keyframe data set to the tracking thread; and an initial facial identity vector updating module 608, configured to determine the optimized facial identity vector as the initial facial identity vector, and return to the first keyframe data set acquiring module 602.

The face tracking apparatus according to the embodiment of the present disclosure performs the face tracking methods according to the third embodiment and the fourth embodiment of the present disclosure, and the face tracking apparatus has corresponding functional modules and effects for performing the face tracking method.

Seventh Embodiment

Figure 7:
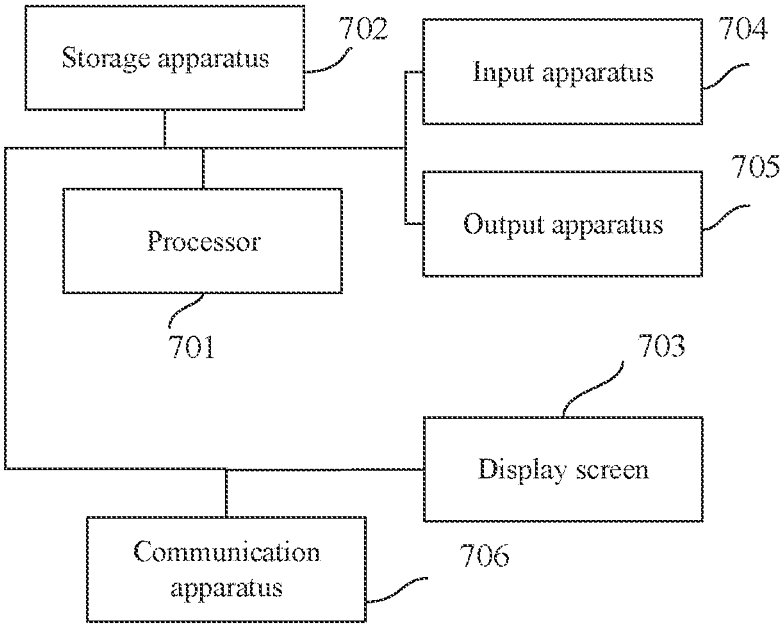
FIG. 7 is a schematic diagram of a structure of an electronic device according to a seventh embodiment of the present disclosure.

FIG. 7 shows a schematic diagram of a structure of an electronic device according to an example of the present disclosure. As shown in FIG. 7, the electronic device includes: a processor 701, a storage apparatus 702, a display screen 703 with a touch function, an input apparatus 704, an output apparatus 705, and a communication apparatus 706. The number of the processor 701 in the electronic device is one or more. By way of example, FIG. 7 shows one processor 701. The processor 701, the storage apparatus 702, the display screen 703, the input apparatus 704, the output apparatus 705, and the communication apparatus 706 of the electronic apparatus are connected by a bus or in other ways. FIG. 7 shows bus connection by way of example. The electronic device is configured to perform the face tracking method as defined in any embodiment of the present disclosure.

The embodiments of the present disclosure further provide a computer-readable storage medium. One or more instructions are stored in the computer-readable storage medium. The one or more instructions, when executed by a processor of a device, cause the device to perform the face tracking methods as defined in the foregoing method embodiments. The computer-readable storage medium is a non-transitory storage medium.

For the embodiments in regard to the apparatus, the electronic device, and the storage medium, since they are substantially similar to the method embodiments, the descriptions are relatively simple, and for relevant parts, reference are made to parts of the descriptions of the method embodiments.

In the description of the specification, the description referring to the terms "one embodiment," "some embodiments," "an example," "specific examples," "some examples," or the like means that specific features, structures, materials or characteristics described in connection with the embodiments or examples are included in at least one embodiment or example of the present disclosure. In the specification, the schematic representations of the above terms are not necessarily intended to refer to the same embodiment or example. In addition, the specific features, structures, materials or characteristics described are combined in any suitable manner in any one or more embodiments or examples.

What is claimed is:

1. A face tracking method, applicable to an optimization thread, the method comprising:

determining a current facial identity vector used by a tracking thread as an initial facial identity vector upon invoking the optimization thread;

acquiring a first keyframe data set, wherein the first keyframe data set is a data set updated by the tracking thread upon performing face tracking, and the first keyframe data set comprises face tracking data;

acquiring optimized face tracking data by optimizing the face tracking data in the first keyframe data set based on the initial facial identity vector;

acquiring an optimized facial identity vector by performing iterative optimization on the initial facial identity vector based on the optimized face tracking data;

upon each iteration, determining, based on the optimized facial identity vector and the initial facial identity vector, whether an iteration stop condition is satisfied;

in response to the iteration stop condition being satisfied, making the tracking thread determine, in response to receiving the optimized facial identity vector, a received facial identity vector as the current facial identity vector by sending the optimized facial identity vector to the tracking thread;

in response to the iteration stop condition being not satisfied, making the tracking thread update, in response to a second keyframe set of a second keyframe data set being a non-empty set, the second keyframe data set to the first keyframe data set upon receiving a clear instruction by sending the clear instruction for clearing video frame in the second keyframe data set to the tracking thread; and determining the optimized facial identity vector as the initial facial identity vector, and returning to the process of acquiring the first keyframe data set.

2. The method according to claim 1, wherein the face tracking data comprises a face keypoint, posture data, and expression data; and acquiring the optimized face tracking data by optimizing the face tracking data in the first keyframe data set based on the initial facial identity vector comprises:

constructing a three-dimensional face model based on the initial facial identity vector and the expression data;

acquiring a face keypoint of the three-dimensional face model; and acquiring optimized posture data and optimized expression data as the optimized face tracking data by solving optimal posture data and optimal expression data based on the face keypoint of the three-dimensional face model and the face keypoint in the face tracking data.

3. The method according to claim 2, wherein acquiring the optimized posture data and the optimized expression data as the optimized face tracking data by solving the optimal posture data and the optimal expression data based on the face keypoint of the three-dimensional face model and the face keypoint in the face tracking data comprises:

solving the optimized face tracking data according to the following formula:

$$(P_i^k, \delta_i^k) = \text{argmin}\left(\sum_j \left\| \prod\nolimits_{P_i}\left(C_0^{k-1} + C_{exp^{k-1}}\delta_i\right)^j - Q_i^j\right\| + \gamma\|P_i, \delta_i\|\right)$$

wherein k represents a $k^{th}$ iteration;

$$C_0^{k-1}$$

represents a neutral face used in the $k^{th}$ iteration; C_exp^(k−1) represents an expression shape fusion deformer used in the $k^{th}$ iteration; $\Pi P_i$ (•) represents j face keypoints acquired by projecting the three-dimensional face model $(C_0+C_{exp}\ \delta_i)^j$; $Q_i$ represents a face keypoint of the face tracking data in the first keyframe data set; $\gamma$ represents a parameter; $\delta_i$ represents the expression data; $P_i$ represents the posture data; and i represents an $i^{th}$ keyframe.

4. The method according to claim 1, wherein the face tracking data comprises a face keypoint, posture data, and expression data; and acquiring the optimized facial identity vector by performing the iterative optimization on the initial facial identity vector based on the optimized face tracking data comprises:

calculating a face size of a tracked face based on the face keypoint;

calculating an expression weight of each keyframe based on the expression data of each keyframe; and acquiring the optimized facial identity vector by performing iterative solving based on the face tracking data, the face size, the expression weight of each keyframe, the current facial identity vector, and the initial facial identity vector.

5. The method according to claim 4, wherein calculating the expression weight of each keyframe based on the expression data of each keyframe comprises:

determining minimum expression data from the expression data of all keyframes; and calculating the expression weight of the keyframe based on a predetermined constant term, the minimum expression data, and the expression data of the keyframe, wherein the expression weight of the keyframe is negatively related to the expression data of the keyframe.

6. The method according to claim 4, wherein acquiring the optimized facial identity vector by performing the iterative solving based on the face tracking data, the face size, the expression weight of each keyframe, the current facial identity vector, and the initial facial identity vector comprises:

constructing a three-dimensional face model based on the current facial identity vector and the expression data of each keyframe;

acquiring a plurality of projected face keypoints by projecting the three-dimensional face model to a two-dimensional plane;

calculating a distance sum between the plurality of projected face keypoints and the face keypoints; and acquiring the optimized facial identity vector by performing the iterative solving based on the expression data, the distance sum, the expression weight of each keyframe, the face size, the current facial identity vector, and the initial facial identity vector.

7. The method according to claim 1, wherein determining, based on the optimized facial identity vector and the initial facial identity vector, whether the iteration stop condition is satisfied comprises:

calculating a face change rate based on the optimized facial identity vector and the initial facial identity vector;

determining whether the face change rate is less than a predetermined change rate threshold;

determining that the iteration stop condition is satisfied in response to the face change rate being less than the predetermined change rate threshold; and determining that the iteration stop condition is not satisfied in response to the face change rate being not less than the predetermined change rate threshold.

8. The method according to claim 7, wherein calculating the face change rate based on the optimized facial identity vector and the initial facial identity vector comprises:

acquiring a face size of an average face;

calculating a distance between a face mesh corresponding to the optimized facial identity vector and a face mesh corresponding to the initial facial identity vector; and calculating a ratio of the distance to the face size of the average face as the face change rate.

9. The method according to claim 1, wherein upon sending the optimized facial identity vector to the tracking thread, the method further comprises:

updating a frame vector of each keyframe based on expression data and posture data of optimized keyframes in the first keyframe data set; and updating a first PCA subspace based on the frame vector of each keyframe.

10. The method according to claim 1, wherein prior to determining the current facial identity vector used by the tracking thread as the initial facial identity vector, the method further comprises:

assigning a first PCA subspace to a second PCA subspace.

11. An electronic device for tracking a face, comprising:

at least one processor; and a storage apparatus configured to store at least one program;

wherein the at least one program, when run by the at least one processor, causes the at least one processor to perform the face tracking method as defined in claim 1.

* * * * *